Oct. 30, 1928.
O. C. REEVES
1,689,685
BENCH MACHINE
Filed April 28, 1921
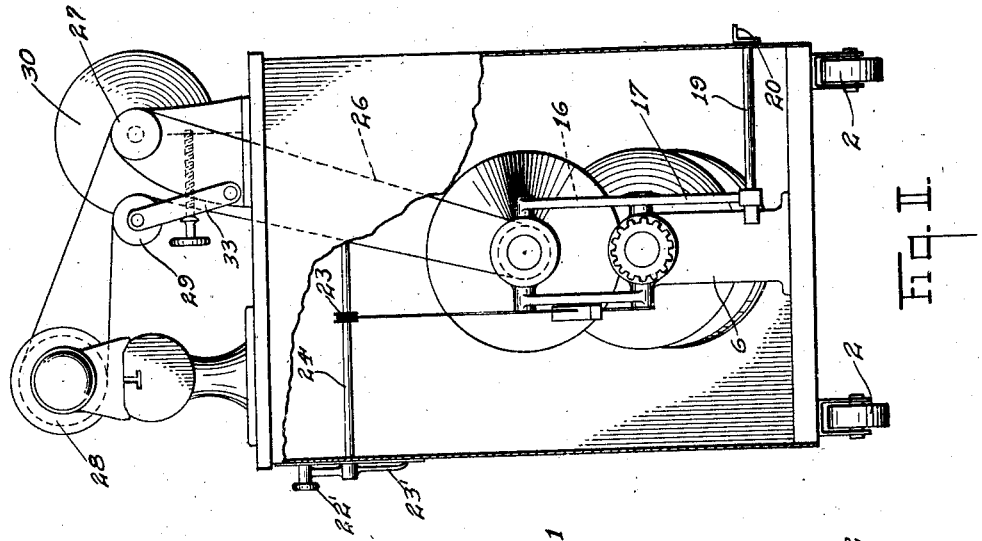
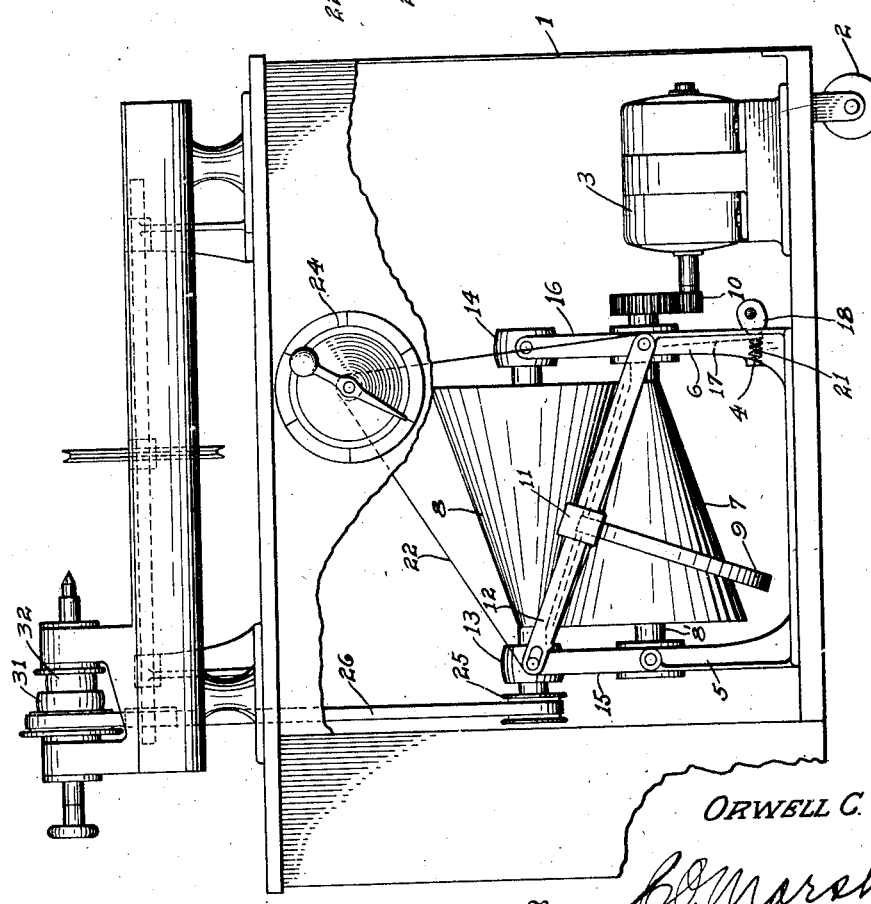
Inventor
ORWELL C. REEVES.
By C.O. Marshall
Attorney Patented Oct. 30, 1928.

1,689,685

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

BENCH MACHINE.

Application filed April 28, 1921. Serial No. 465,341.

This invention relates to machines of comparatively light construction such as are commonly known as bench machines, and, while it may be applied to machines of various types, and machine tools, it is particularly applicable to metal turning machines, and I have therefore illustrated it as applied to a bench lathe.

One of the principal objects of the invention is to provide a portable self-contained unit incorporating the power and transmission mechanism as well as the bench and lathe or other machine.

Another object is to provide a complete machine unit which may be moved about from room to room, thus increasing the flexibility of production equipment and making possible the better utilization of valuable space.

Another object is to provide a machine unit of this kind which may be supplied to and operated in shops that are not provided with shafting.

Another object is to provide a conveniently supported machine having a compactly arranged and safely housed variable speed transmission capable of infinitely varying the speed of the machine and provided with a reliable and easily operated control.

Still another object is to provide a variable speed transmission including a pair of oppositely turned cone pulleys and efficient means for connecting and disconnecting these pulleys from each other.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of the device of my invention, part of the front wall of the housing being broken away to show the transmission mechanism; and Figure 2 is an end elevation of the device with part of the housing wall broken away and the motor removed.

Referring to the drawings in detail, the bench lathe, which, as illustrated, is of known construction, is supported upon a cabinet 1 which in turn is supported upon wheels or large castors 2.

Mounted upon the floor of the cabinet 1 is a motor 3, the cabinet being provided with a suitably located plug (not shown) so that the motor may be readily connected to a light or power circuit. Secured to the floor of the cabinet adjacent the motor 3 is a frame 4 having a pair of standards or uprights 5 and 6 to support the variable speed transmission mechanism.

The variable speed transmission mechanism consists essentially of a pair of oppositely-turned conical pulleys 7 and 8 and a belt 9 by which pull is transmitted from one pulley to the other. The lowermost pulley 7 is fixed upon a shaft 8' journaled in the uprights 5 and 6 and having a gear wheel keyed to its end. The gear wheel meshes with a pinion 10 fixed upon the end of the armature shaft of the motor, whereby the rotary motion of the armature is transmitted to the conical pulley 7.

The belt 9 loosely surrounds the pulley 7 and is movable therealong by means of a guide 11 having a slot through which the belt loosely passes, the guide being slidably mounted upon a bar 12 extending substantially parallel to the upper surface of the pulley 7. It is obvious that the speed of the belt is the same as the peripheral speed of the portion of the pulley 7 with which it is in engagement. If it engages the pulley near its small end, its speed will be comparatively slow, and if it engages the pulley near its large end, its speed will be comparatively great, with an infinite variation of speed for positions between the ends.

The upper conical pulley 8 is journaled in bearings 13 and 14 which are pivotally mounted respectively upon upright frames 15 and 16 pivoted to the upper ends of the uprights 5 and 6. The upper pulley may thus be swung toward or away from the lower pulley 7, but, owing to the parallelogrammatic relation of the pivots at the ends of the frames 15 and 16, its axis at all times remains horizontal and its lower side, therefore, remains parallel to the upper side of the pulley 7. An arm 17 extends downwardly from the frame 16 and is engaged by a cam 18 that is fixed upon the end of a rock shaft 19 adapted to be rocked by means of a treadle 20. When the shaft 19 is rocked the arm 17 and consequently the frames 16 and 15 are swung on their pivots and the conical pulley 8 is thus moved into or out of engagement with the belt 9, being moved out of engagement when the cam is turned to the position shown in Figure 1, and when the cam is turned away from such position the arm and the frames 16 and 15 are swung by the spring 21 so as to bring the pulley 8 into engagement with the belt 9. When the pulley 8 is brought into firm engagement with the belt and the pulley 7 is rotated by the motor 3, thus communicating movement to the belt, the movement of the belt will be communicated to the pulley 8, the peripheral speed of the portion of the surface of the pulley 8 which engages the belt being, of course, the same as the speed of the belt. The speed in rotations per minute of the pulley 8 depends, however, not only upon the speed of the belt, but upon the portion of its surface which is engaged with the belt. If the belt engages the pulley 8 near its larger end, the speed of the pulley in rotations per minute will be much smaller than if the belt 9 engages the pulley 8 near its smaller end. Owing to the fact that the pulleys are turned in opposite directions, the belt will, of course, be traveling at a smaller rate of speed when it engages the pulley 8 adjacent its large end than when it engages the pulley adjacent its small end.

The bar 12 upon which the guide 11 is slidably mounted is supported at one end upon the upright 6 and at its other end upon the frame 15, movement of the frame being provided for by means of a pin-and-slot connection. The guide 11 is movable along the bar 12 by means of a cable 22, the ends of which are attached to the guide 11, the intermediate portions of the cable passing over pulleys at the ends of the bar 12 and being wound about a pulley 23 fixed upon a shaft 24 which is journaled in the housing 1 and provided with an operating handle 22' and indicator 23' located on the front wall of the housing. The indicator 23' is arranged to co-operate with a dial 24 so that the speed at which the transmission is set to operate the machine is at all times apparent.

The shaft upon which the upper conical pulley 8 is fixed is provided with a pulley 25 which operates a belt 26 that passes over pulleys 27 and 28 and an idler pulley 29 on the turning machine which is located upon the top of the cabinet. The pulley 27 is fixed on a shaft which carries a large grooved pulley 30 that may, if desired, be used to drive a high-speed grinder. The pulley 28 is fixed upon the main shaft of the lathe. This shaft is shown as provided with additional pulleys 31 and 32, with any one of which the belt 26 may be engaged when the machine is set up. It is not necessary, however, that the shaft be provided with more than one pulley. The pulley 29 is merely an idler and is so mounted upon an arm 33 that it may be moved to tighten the belt 26.

Since my invention does not reside in the lathe per se, and since other types of lathes or machine tools may be substituted in the combination of my invention, I will not describe it in detail.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a cabinet, transmission mechanism mounted within said cabinet, said transmission mechanism comprising a stationary frame, a conical pulley journaled therein, pivoted frames connected to said stationary frame, an oppositely turned conical pulley supported by said pivoted frames, a belt passing between said pulleys, means for swinging said pivoted frames to bring said pulleys into operative engagement with said belt, and a bench machine mounted upon said cabinet and operatively connected to said transmission mechanism.

2. In a device of the class described, in combination, a cabinet, transmission mechanism mounted within said cabinet, said transmission mechanism comprising a pair of oppositely turned conical pulleys, a belt passing between said pulleys, and means for moving one of said pulleys toward or away from the other, consisting of a pair of pivoted frames pivotally connected to bearings at the ends of said movable pulley and adapted to swing said bearings through equal parallel arcs whereby the loci of the axis of the movable pulley are parallel, a bench machine mounted on said cabinet, and means operatively connecting said bench machine and said transmission mechanism.

3. In a device of the class described, in combination, a pair of oppositely turned conical pulleys, a belt passing between said pulleys, and means for moving one of said pulleys toward or away from the other consisting of a pair of pivoted frames pivotally connected to bearings at the ends of said movable pulley and adapted to swing through equal arcs whereby the loci of the axis of said movable pulley are parallel.

ORWELL C. REEVES.